US009604847B2

(12) United States Patent
Goudy et al.

(10) Patent No.: US 9,604,847 B2
(45) Date of Patent: Mar. 28, 2017

(54) RUBIDIUM HYDRIDE CATALYZED ALLOYS

(71) Applicant: Delaware State University, Dover, DE (US)

(72) Inventors: Andrew Goudy, Dover, DE (US); Tolulope Durojaiye, Middletown, DE (US); Jalaal Hayes, Philadelphia, PA (US)

(73) Assignee: DELAWARE STATE UNIVERSITY, Dover, DE (US)

( * ) Notice: Subject to any disclaimer, the term of this patent is extended or adjusted under 35 U.S.C. 154(b) by 451 days.

(21) Appl. No.: 14/264,875

(22) Filed: Apr. 29, 2014

(65) Prior Publication Data
US 2014/0326920 A1 Nov. 6, 2014

Related U.S. Application Data

(60) Provisional application No. 61/817,886, filed on May 1, 2013.

(51) Int. Cl.
*C01B 3/00* (2006.01)
*B01J 31/12* (2006.01)

(52) U.S. Cl.
CPC .......... *C01B 3/0031* (2013.01); *B01J 31/121* (2013.01); *Y02E 60/327* (2013.01)

(58) Field of Classification Search
CPC .............................. B01J 31/121; C01B 3/0031
See application file for complete search history.

(56) References Cited

PUBLICATIONS

Aoki et al., Appl. Phys. A, 80:1409-1412 (2005).
Barison, Journal of Alloys and Compounds, 459:343-347 (2008).
Černý et al., J. Phys. Chem. C, 114:1357-1364 (2010).
Durojaiye et al., Int'l Journal of Hydrogen Energy, 35:10329-10333 (2010).
Durojaiye et al., Int'l Journal of Hydrogen Energy, 37:3298-3304 (2012).
Durojaiye et al., The Journal of Physical Chemistry C, 117:6554-6560 (2013).
Elansari et al., Journal of Alloys and Compounds, 329:L5-L8 (2001).
Fang et al., Int'l Journal of Hydrogen Energy, 35:8247-8252 (2010).
Hancock et al., Journal of the American Ceramic Society, vol. 55, 2:77 (1972).
Goudy et al., Materials Challenges in Alternative and Renewable Energy, 14 pages (2012).
Hu et al., Chemistry of Materials, 21:3485-3490 (2009).
Ibikunle et al., Int'l Journal of Hydrogen Energy, 37:12420-12424 (2012).
Ibikunle et al., Journal of Alloys and Compounds, 475:110-115 (2009).
Ibikunle et al., Journal of Alloys and Compounds, 556:45-50 (2013).
Jacobs et al., Journal of the Less-Common Metals, 97:205-214 (1984).
Jain et al., Journal of Alloys and Compounds, 503:303-339 (2010).
Jiang et al., Journal of Alloys and Compounds, 509:9055-9059 (2011).
Kissinger, Analytical Chemistry, vol. 29, 11:1702-1706 (1957).
Liang et al., Int'l Journal of Hydrogen Energy, 36:2137-2144 (2011).
Liu et al., Chem. Mater., 20:3521-3527 (2008).
Luo et al., Int'l Journal of Hydrogen Energy, 37:6646-6652 (2012).
Luo et al., Journal of Alloys and Compounds, 407:274-281 (2006).
Luo, Journal of Alloys and Compounds, 381:284-287 (2004).
Markmaitree et al., Int'l Journal of Hydrogen Energy, 33:3915-3924 (2008).
Mauron et al., J. Phys. Chem. B, vol. 112, 3:906-910 (2008).
Meisner et al., Journal of Alloys and Compounds, 404-406: 24-26 (2005).
Nayebossadri, Int'l Journal of Hydrogen Energy, 36:8335-8343 (2011).
Orefuwa et al., Microporous and Mesoporous Materials, 153:88-93 (2012).
Orefuwa et al., Microporous and Mesoporous Materials, 177:82-90 (2013).
Osborn et al., Int'l Journal of Hydrogen Energy, 34:4331-4339 (2009).
Pinkerton, Journal of Alloys and Compounds, 400:76-82 (2005).
Rijssenbeck et al., Journal of Alloys and Compounds, 454:233-244 (2008).
Sabitu et al., Int'l Journal of Hydrogen Energy, 37:12301-12306 (2012).
Sabitu et al., Journal of Alloys and Compounds, 499:35-38 (2010).
Sabitu et al., Journal of Alloys and Compounds, 509S:S588-S591 (2011).
Sabitu et al., Metals, 2:219-228 (2012).
Sabitu et al., The Journal of Physical Chemistry C, 116:13545-13550 (2012).
Shahi et al., Int'l Journal of Hydrogen Energy, 35:238-246 (2010).
Smith et al., Journal of Alloys and Compounds, 316:93-98 (2001).
Wang et al., Angew. Chem. Intl. Ed., 48:5828-5832 (2009).
Yang et al., Advances in Materials Science and Engineering, pp. 1-7 (2010).
Yang et al., J. Phys. Chem. C, 113:14512-14517 (2009).
Yang et al., Journal of Alloys and Compounds, 430:334-338 (2007).
Zaluska et al., Journal of Alloys and Compounds, 298:125-134 (2000).
Zhou et al., The Journal of Physical Chemistry C, 116:1588-1595 (2012).

*Primary Examiner* — Peter F Godenschwager
(74) *Attorney, Agent, or Firm* — RatnerPrestia

(57) ABSTRACT

A catalyzed metal hydride alloy is disclosed, which includes lithium amide and magnesium hydride and rubidium hydride is the catalyst. A method of making the metal hydride alloy includes combining rubidium hydride with lithium amide and magnesium hydride in a vessel to form a mixture and mechanically milling the mixture. A method of manufacturing rubidium hydride is also disclosed which includes milling rubidium metal in a vessel pressurized with hydrogen gas at an initial minimum rotation rate and increasing the rotation rate to a maximum rotation rate, alternating between periods of milling and rest, re-pressurizing the vessel with hydrogen during the rest periods, and incubating the contents of the vessel.

12 Claims, 12 Drawing Sheets

RUBIDIUM HYDRIDE CATALYZED ALLOYS

CROSS-REFERENCE TO RELATED APPLICATION

This application claims priority to U.S. Provisional Application 61/817,886 filed on May 1, 2013, the contents of which are incorporated herein by reference for all purposes.

FIELD OF THE INVENTION

The invention generally relates to catalyzed metal hydride alloys, in particular rubidium hydride containing alloys, that may be used in hydrogen storage systems.

BACKGROUND OF THE INVENTION

Because of the commercial and regulatory demands to reduce vehicle emissions, a possible viable alternative, which many automakers are researching, is the use of hydrogen as a fuel source for fuel cells or combustion engines. There are several technical obstacles to achieving an acceptable hydrogen-based powering system for vehicles. Some of these obstacles include developing an economical process for the manufacture of hydrogen, constructing a refueling infrastructure, as well as ensuring a safe and effective on-board hydrogen storage system.

Most fuel cell and combustion engine designs require the delivery of hydrogen in the form of a gas, but current hydrogen storage cylinders do not have the volume capacity that would allow for a reasonable driving range. In order to fill the cylinders with enough hydrogen gas to achieve a reasonable driving range, cylinders would need to be developed that can withstand high pressures, e.g. >10,000 psi. The hydrogen gas delivery system of the vehicle would then require careful design and selection of materials that can safely maintain these excessive pressures, resulting in increased costs of the vehicle design. Therefore, a vehicle which stores hydrogen in a gaseous state is unlikely to provide an acceptable solution.

An alternative to using highly-pressurized vessels to hold hydrogen gas is the use of solid metal hydrides. Instead of filling a vessel with pressurized and combustible hydrogen gas, the vessels are filled with metal hydride powder. The solid offers a much safer form. Upon heating the metal hydride, a reaction occurs causing the release of hydrogen gas. When refilling the vessel, the dehydrided material will absorb the hydrogen gas and return to a hydrided state. The typical pressures for these hydrogen storage systems is much lower, around 250 psi. Also, a vessel containing metal hydride is able to store more hydrogen than a cylinder containing only hydrogen gas. Thus, metal hydride systems offer a safer and more-cost effective alternative to pressurized hydrogen gas cylinders.

In recent years, complex metal hydrides have been widely studied for hydrogen storage applications because of their relatively high hydrogen-holding capacities. Systems of interest include alanates, borohydrides, and amides. However, various scientific and technological barriers need to be overcome to optimize the potential of these materials. Problems such as high desorption temperatures, slow kinetics, poor reversibility due to loss of ammonia or diborane, and the formation of stable intermediates have been identified with many of these systems. Some mixtures of these compounds have yielded improvements. Examples of binary mixtures that have been studied include $LiNH_2/MgH_2$, $Mg(NH_2)_2/2LiH$, $LiBH_4/CaH_2$, $LiBH_4/MgH_2$, $Mg(BH_4)_2/Ca(BH_4)_2$, $LiBH_4/LiNH_2$, $LiNH_2/LiH$, and $MgH_2/LiH$.

The U.S. Department of Energy Metal Hydride Center of Excellence (MHCoE) has described the lithium amide/magnesium hydride ($2LiNH_2/MgH_2$) system as an important "near term" system for hydrogen storage that would be a good candidate for engineering subsystem testing. This is because of its good long-term cycling behavior and higher hydrogen capacity than other metal hydrides currently investigated for their hydrogen storage capacity, such as sodium aluminum hydride. The mechanism of its hydrogen release and the general reaction scheme for the $2LiNH_2/MgH_2$ system proceed according to the following equations:

$$MgH_2 + 2LiNH_2 \rightarrow Mg(NH_2)_2 + 2LiH \quad (1)$$

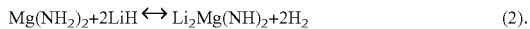

$$Mg(NH_2)_2 + 2LiH \leftrightarrow Li_2Mg(NH)_2 + 2H_2 \quad (2).$$

Recently, more work has been focused on lowering the desorption temperature and improving the kinetics, i.e. the rate of hydrogen desorption, of the $2LiNH_2/MgH_2$ system with effective catalysts. Several additives such as NaOH, V, $V_2O_5$, $VCl_3$, Si, and Al have been tried. Perhaps the most effective catalyst to date has been potassium hydride (KH). However, there is still a need to identify catalysts that will further improve the kinetics and lower the desorption temperatures for these hydrogen storing alloys.

SUMMARY OF THE INVENTION

It is one aspect of the present invention to provide a metal hydride alloy comprising magnesium hydride, lithium amide, and at least one catalyst, wherein the at least one catalyst includes rubidium hydride. In one embodiment, the metal hydride alloy is provided in the form of a powder.

It is another aspect of the present invention to provide a hydrogen storage system, for example for a vehicle, comprising a pressurized vessel containing a catalyzed metal hydride alloy according to an embodiment of the present invention.

It is yet another aspect of the present invention to provide a method of making a catalyzed metal hydride alloy. In one embodiment of the present invention, the method comprises combining magnesium hydride, lithium amide, and rubidium hydride in a vessel, such as a ball mill, to form a powdered mixture and then mechanically milling the powdered mixture.

It is yet another aspect of the present invention to provide a method of making rubidium hydride. In one embodiment of the present invention, the method of making rubidium hydride may include combining rubidium and a plurality of milling balls in a vessel under an inert atmosphere, closing the vessel, evacuating at least a portion of inert gas from the vessel, and pressurizing the vessel with hydrogen gas. The contents of the vessel may be mechanically alloyed in a first step comprising milling the rubidium at a rotation rate, wherein the rotation rate is initially equal to a minimum rotation rate and the rotation rate is increased to a maximum rotation rate, then mechanically alloying in a second step comprising a plurality of cycles, wherein each cycle comprises a milling period to mill the contents of the vessel and a rest period to re-pressurize the vessel with hydrogen gas. Following milling, the contents of the vessel may be heated in an inert atmosphere.

BRIEF DESCRIPTION OF THE FIGURES

In order that the invention may be more fully understood, the following figures are provided by way of illustration, in which.

DETAILED DESCRIPTION OF THE INVENTION

Figure 1:
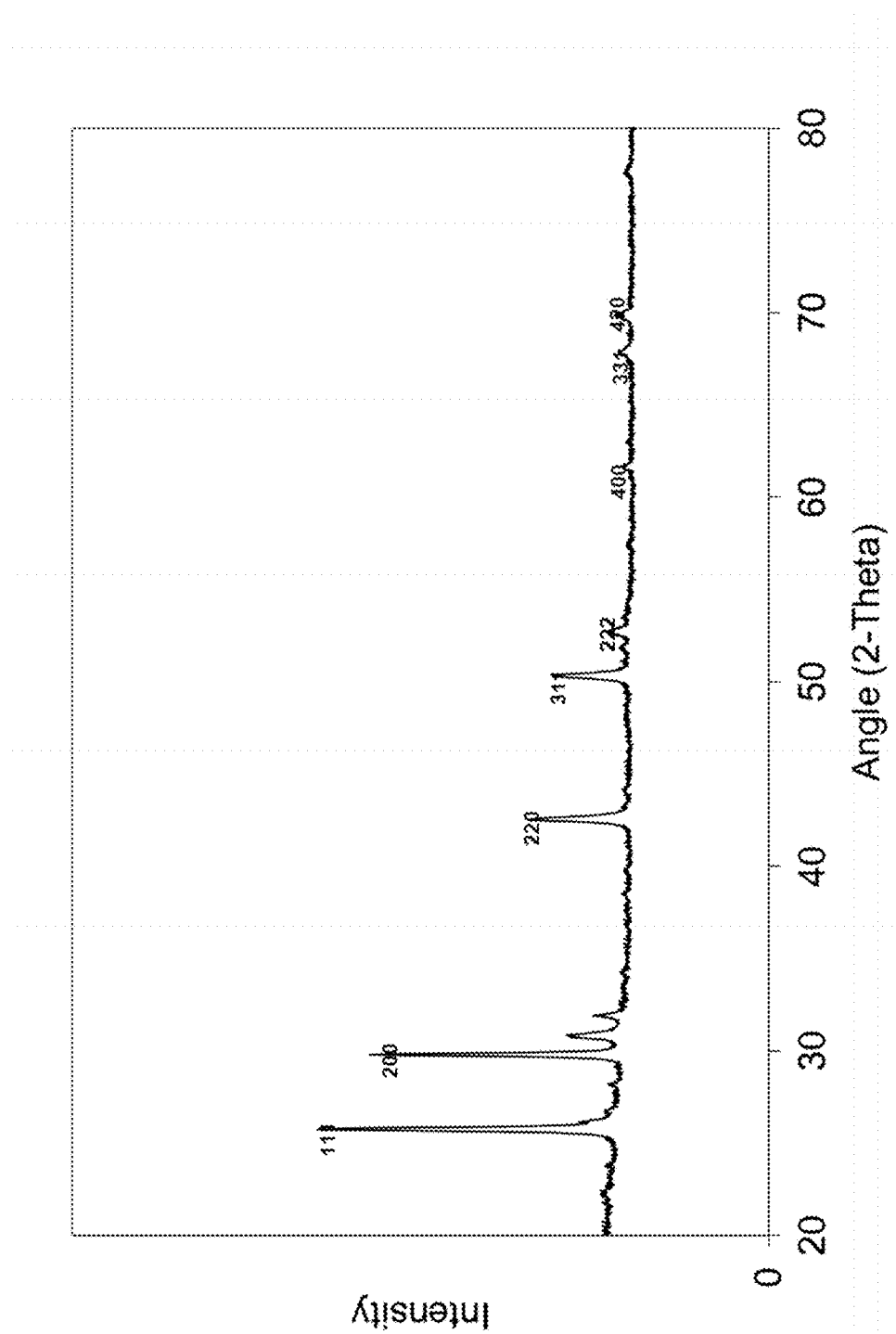
FIG. 1 is an X-ray diffraction (XRD) pattern for a sample of RbH according to an embodiment of the present invention.

KH is recognized as an effective catalyst for the $LiNH_2/MgH_2$ system. Applicants have now discovered that RbH also serves as a suitable catalyst for such a system. Applicants found that an RbH doped sample of $LiNH_2/MgH_2$ released hydrogen at a slightly lower temperature than a KH doped sample, both of which were about 90° C. lower than an un-catalyzed sample. Applicants surprisingly found that the hydrogen desorption rate of an RbH doped sample was approximately twice as fast as a KH doped sample and about sixty times faster than an un-catalyzed sample.

There is a lack of commercially available RbH because of the difficulty associated with manufacturing a pure form of the catalyst. In one embodiment of the present invention, a method of producing RbH is provided that may comprise a combining step, a first mechanical alloying step, a second mechanical alloying step, and an incubation step.

The combining step comprises adding rubidium to a vessel with a plurality of milling balls. The balls may be stainless steel, but are preferably made of tungsten carbide. Because rubidium, like most alkali metals, is readily oxidized, the rubidium and milling balls are preferably added to the vessel in an inert atmosphere, like argon, for example and the vessel is sealed to prevent the intrusion of contaminants, such as air. Upon closing the vessel, the inert gas within the vessel is removed and then pressurized with hydrogen gas.

The first mechanical alloying step comprises milling the rubidium and increasing the rotation rate of the vessel from a minimum rotation rate to a maximum rotation rate. The rotation rate is increased, preferably, in a stepwise fashion. For example, the minimum rotation rate may be 100 rpm and the maximum rotation rate may be 250 rpm, and the rotation rate may be increased by 25 rpm every fifteen minutes. It is preferred, that the first mechanical alloying step is conducted at least twice, more preferably, at least four times. Again, it is preferable to maintain a sealed vessel during milling to prevent the contamination of the contents of the vessel.

The second mechanical alloying step comprises a plurality of cycles, wherein each cycle comprises a milling period for milling the rubidium and a rest period. The rotation rate during the milling period is preferably the maximum rotation rate. During the rest period, the vial may be pressurized with hydrogen gas. The milling period is preferably longer than the rest period, most preferably, the milling period is at least twice as long as the rest period. The plurality of cycles may be at least ten cycles, more preferably at least twenty cycles, and most preferably at least thirty cycles. The sum of the milling period for the plurality cycles is at least six hours, more preferably at least nine hours, and most preferably at least twelve hours.

The incubation step comprises pressurizing the vessel with hydrogen gas and heating the contents of the vessel, such that the final form of the RbH is a white powder. Preferably, the incubation step comprises heating the contents of the vessel at around 120° C. for at least one hour.

According to another embodiment of the invention, a metal hydride alloy is provided that comprises magnesium hydride ($MgH_2$), lithium amide ($LiNH_2$), and at least one catalyst, wherein the at least one catalyst includes rubidium hydride (RbH). Preferably, the RbH is included in the metal hydride alloy in an amount sufficient to catalyze the reaction of Equation (2). Preferably, the RbH comprises at least 1 mol % of the metal hydride alloy, more preferably at least 2 mol %, and most preferably at least 3 mol %. The RbH may be added to replace a portion of the lithium amide in a binary mixture of $LiNH_2/MgH_2$. Therefore, for example, if stoichiometric amounts of lithium amide and magnesium hydride are combined according to Equation (1) and a desired metal hydride alloy having 4 mol % of RbH is desired, the respective mol % of lithium amide and magnesium hydride would be 64% and 32%. Preferably, the molar ratio of the sum of the moles of $LiNH_2$ and RbH to the moles of $MgH_2$ is in the range of 1.8:1 to 2.2:1. The metal hydride alloy may be made by combining RbH, $MgH_2$, and $LiNH_2$ in a vessel, such as a ball mill, in the amounts described to form a powdered mixture and mechanically alloying the powdered mixture. Milling preferably occurs under an inert atmosphere, such as argon, for example.

According to another embodiment of the invention, a hydrogen storage system is provided that may comprise a vessel containing a catalyzed metal hydride alloy, wherein the catalyst is RbH. Typically, a hydrogen storage system containing a metal hydride includes a heating system and cooling system to control the temperature of the system. Heating the metal hydride will cause desorption, while cooling will control the temperature associated with the exothermic reaction and facilitate the resorption of hydrogen gas. The cooling system may include various features known to those familiar with these systems, such as a circulating coolant or heat dissipating fins. The metal hydride alloy preferably comprises $MgH_2$ and $LiNH_2$ and may be provided in a powder form.

The hydrogen storage system according to the present invention maintains the same advantages of other metal hydride containing systems, e.g. low operating temperatures and pressures and higher hydrogen gas volume capacity, as well as providing additional advantages of increased desorption rates. Thus, yet another embodiment of the present invention provides a vehicle that includes a hydrogen storage system containing an RbH catalyzed metal hydride alloy, which would advantageously provide the vehicle with increased range in addition to a more cost-effective and safer hydrogen gas delivery system.

EXAMPLE

In order that the invention may be more fully understood, the following Example is provided by way of illustration only.

All starting materials were obtained from Sigma-Aldrich Co. LLC.

Preparation of RbH

Approximately 4-5 grams of rubidium (99.6% pure) was added to a 45 ml stainless steel vial followed by ten tungsten carbide (WC) balls having about a 10 mm diameter in a purified argon filled glovebox. Once the vial was closed and sealed, the vial was removed from the glovebox, a vacuum was used to remove the argon gas in the vial, and the vial was subsequently filled with hydrogen gas (98% pure) until about 90 psi. The vial was placed on a Pulverisette® 7 planetary mill manufactured by FRITSCH GmbH. Milling progressed according to the following procedure:

1) Milling the contents of the vial at 100 rpm for 15 minutes;
2) Repeatedly increasing the rotation rate by 25 rpm every 15 minutes from 100 rpm to 250 rpm;
3) Upon reaching 250 rpm, maintaining the rotation rate for 15 minutes followed by a 10 minute rest period;
4) Repeating steps 1) to 3) three additional times;
5) Milling the vial at a rotation rate of 250 rpm for 12 hours, which included 36 cycles of 20 minute milling and 10 minute pause times, and re-pressurizing the vial with hydrogen gas to 90 psi before the start of each cycle; and
6) After the 12 hour milling was complete, re-pressurizing the vial with hydrogen gas to 90 psi and incubating the vial in an oven at 120° C. for 1 hr.

During Step 2) above, the vial was removed from the planetary mill, and the lid of the vial was changed to prevent the spread of the alkali metal from clogging any ports and interfering with the ability to re-pressurize the vial with hydrogen gas. Care was taken during pressurization, milling, and incubation to prevent exposure of the contents of the vial to air. The above procedure produced a white powder. As seen in FIG. 1, the X-ray powder diffraction pattern of the sample confirms that RbH was indeed produced.

Preparation of Metal Hydride Alloy Samples

Mixtures of catalyzed $LiNH_2/MgH_2$ were prepared by mechanical alloying a mixture of $1.9LiNH_2/1.1MgH_2$ with 3.3 mol % of either KH or RbH in a 65 mL stainless steel milling pot containing ~20 g balls (two 12 mm and four 6 mm balls). The $LiNH_2$ was 95% pure, and the $MgH_2$ was of hydrogen storage grade, 98% pure. The mixtures were mechanically milled in a SPEX™ 8000D Dual Mixer/Mill™ manufactured by Thermo Fisher Scientific Inc., for 2 hours under an argon atmosphere. This procedure was repeated to produce an uncatalyzed sample of $2LiNH_2/MgH_2$ by excluding KH and RbH from the mixture.

Summary of Analytical Methods

X-ray characterizations of the materials were carried out using an X'Pert Pro MPD X-ray Diffractometer model PW3040 Pro manufactured by PANalytical B.V. Analyses were done using copper K-alpha radiation. The instrument was equipped with an accelerator detector that allowed for rapid analyses. Samples were covered with a polyimide film (Kapton manufactured by E. I. du Pont de Nemours and Company) for protection from air and moisture outside of the glovebox during analyses. Kapton has very high transmittance to X-rays such that no adjustment was required.

Temperature-programmed desorption (TPD) and pressure composition isotherm (PCI) analyses were done on the as milled materials using a Gas Reaction Controller-PCI unit manufactured by Advanced Materials Corporation. TPD measurements were carried out between 30 and 230/300° C. for the various mixtures at 4° C./min. Data for isotherm temperatures ranging from 190 to 230° C. were collected using LabVIEW, software distributed by National Instruments Corporation. The data obtained were used to calculate the enthalpy of each system from van't Hoff plots.

Differential thermal analyses (DTA) were carried out under an argon atmosphere using a TGA/DTA instrument manufactured by PerkinElmer Inc. This instrument was used to determine the thermostability of the Li—Mg—N—H systems. DTAs were carried out between 30 and 230/300° C. for various mixtures at 4° C./min. Data obtained from the DTA curves were used to calculate activation energies from Kissinger plots.

Desorption kinetics measurements were carried out in the plateau region of the isotherms at 210° C. For easy comparison, the kinetics were run at the same temperature and thermodynamic driving force. To achieve the same thermodynamic driving force for all of the experiments, the same ratio of plateau pressure to applied pressure was applied to each sample.

X-Ray Diffraction (XRD) Analysis

The $2LiNH_2/MgH_2$ system reacts with hydrogen according to the reactions described in Equations (1) and (2). XRD measurements were done on the hydrided and dehydrided mixtures, with and without RbH catalyst, to confirm that the catalyzed $2LiNH_2/MgH_2$ system could absorb and release hydrogen reversibly.

Figure 1A:
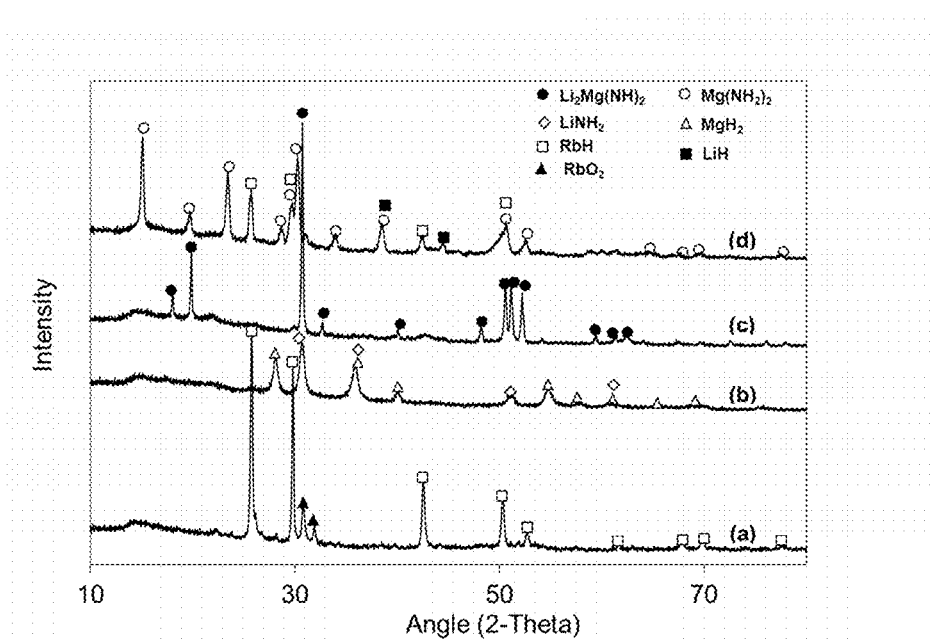
FIG. 1A includes XRD patterns of a metal hydride alloy comprising a $2LiNH_2/MgH_2$ mixture catalyzed by RbH according to an embodiment of the present invention and its dehydrided and rehydrided forms.

Referring to FIG. 1A, plot (a) shows the XRD pattern for the RbH catalyst; plot (b) contains a pattern for the "as-milled" sample of RbH-catalyzed $2LiNH_2/MgH_2$ mixture; while plots (c) and (d) contain patterns for the dehydrided and hydrided mixtures, respectively. A comparison of the patterns shows some significant differences in the dehydrided and hydrided samples. The pattern for the as-milled sample in plot (b) contains peaks for the reactants $MgH_2$ and $2LiNH_2$. Upon complete dehydrogenation, plot (c) contains only peaks for the expected dehydrogenated product, $Li_2Mg(NH)_2$. This product has an orthorhombic structure. No RbH peaks appear in this XRD pattern. However, upon rehydrogenation, the pattern in plot (d) is obtained. No peaks for the initial reactants $MgH_2$ and $2LiNH_2$ are seen. This XRD pattern contains peaks for $(Mg(NH_2)_2+LiH)$, as indicated in Equation (2) along with peaks for the RbH catalyst. This confirms that the reaction in Equation (2) occurs reversibly.

Since RbH was reformed this indicates that it was not consumed during the reaction and that it is truly behaving as a catalyst.

Figure 1B:
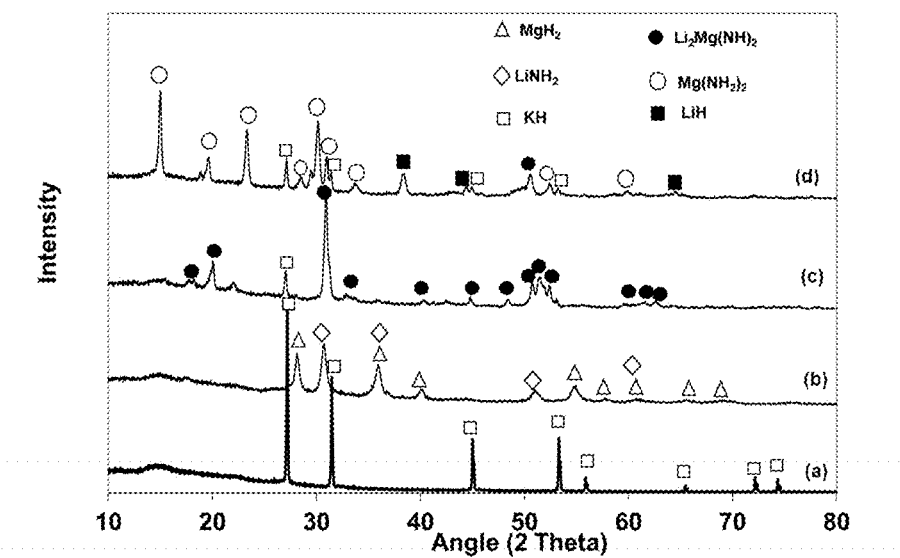
FIG. 1B includes XRD patterns of a metal hydride alloy comprising a $2LiNH_2/MgH_2$ mixture catalyzed by KH and its dehydrided and rehydrided forms.

Referring to FIG. 1B, plot (a) shows the XRD pattern for the KH catalyst; plot (b) contains a pattern for the "as-milled" sample of the KH-catalyzed 2LiNH$_2$/MgH$_2$ mixture; while plots (c) and (d) contain patterns for the dehydrided and hydride mixtures, respectively. A comparison of the patterns shows that the as-milled sample in plot (b) contains peaks for the reactants MgH$_2$ and 2LiNH$_2$. Upon complete dehydrogenation, the pattern in plot (c) contains only peaks for the expected dehydrogenated product, Li$_2$Mg(NH)$_2$. This is the same behavior that was observed for the RbH-catalyzed mixture. However, unlike the dehydrogenated RbH-catalyzed mixture, a peak at 27° for KH does appear in this XRD pattern for the dehydrogenated state. The most likely reason for the observed difference is the fact that the dehydrogenations were done at 210° C. RbH decomposes at 170° C., and therefore none of its peaks appear in the dehydrogenated pattern. However, KH does not decompose until 400° C., and thus it has a peak in the dehydrogenated pattern. Upon rehydrogenation, the pattern in plot (d) is obtained. No peaks for the initial reactants MgH$_2$ and 2LiNH$_2$ are seen. This XRD pattern contains peaks for (Mg(NH$_2$)$_2$+LiH), as indicated in Equation (2) along with peaks for the KH catalyst. This is the same behavior that was observed for the RbH-catalyzed mixture.

Temperature-Programmed Desorption (TPD)

Figure 2:
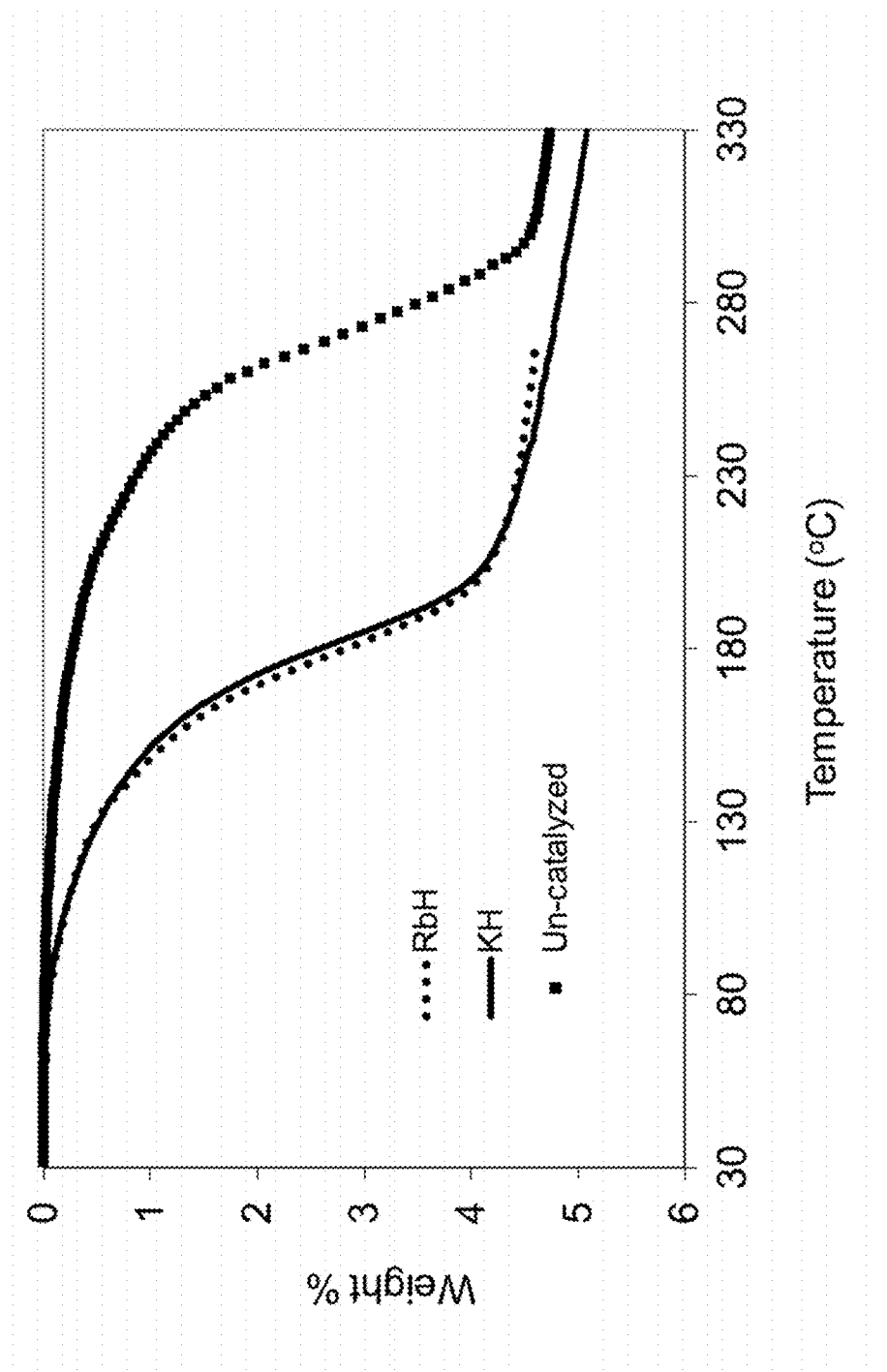
FIG. 2 is a plot of temperature programmed desorption curves for an uncatalyzed sample of $LiNH_2/MgH_2$, a sample catalyzed with KH, and a sample made according to an embodiment of the present invention.

TPD measurements were performed on 2LiNH$_2$/MgH$_2$ systems using RbH and KH catalysts to compare their effectiveness. The samples were heated from 30 to 250/350° C. at 4° C./min. The results are shown in FIG. 2. When reporting TPD results, it is a common practice to report the onset temperatures of the dehydrogenation process, but onset temperatures can be misleading since they are the temperature at which dehydrogenation just begins to occur. This temperature is often much lower than that during which the bulk of the hydrogen is released. Therefore, desorption temperatures that correspond to the inflection point of the TPD curves were compared. The results in FIG. 2 show that the desorption temperatures, T$_d$, are in the order: RbH≤KH<<Uncatalyzed. The onset temperatures and desorption temperatures for these materials are reported in Table 1.

TABLE 1

|  | KH | RbH | uncatalyzed |
|---|---|---|---|
| Onset Temp. (° C.) | 75 | 76 | 109 |
| Desorp. Temp., T$_d$ (° C.) | 146 | 143 | 237 |
| Desorp. ΔH (kJ/mol) | 42.0 ± 0.12 | 42.7 ± 0.03 | 65.8 ± 0.04 |
| T$_{90}$ (min) | 62 | 27 | 1600 |
| E$_a$ (kJ/mol) | 87.0 ± 0.7 | 86.8 ± 0.1 | 119.0 ± 1.7 |
| P$_m$ at 210° C. (atm) | 46.1 | 48.3 | 34.2 |
| "m" values | 0.587 | 0.652 | 0.647 |

The fact that RbH- and KH-catalyzed mixtures have much lower desorption temperatures than the uncatalyzed mixture is a bit surprising. If the RbH and KH are truly behaving as catalysts, they should not have any effect on the desorption temperature of this system. The thermodynamic stabilities of these mixtures were then studied to further investigate this phenomenon.

Pressure Composition Isotherm Analysis and Van't Hoff Plots

Figure 3A:
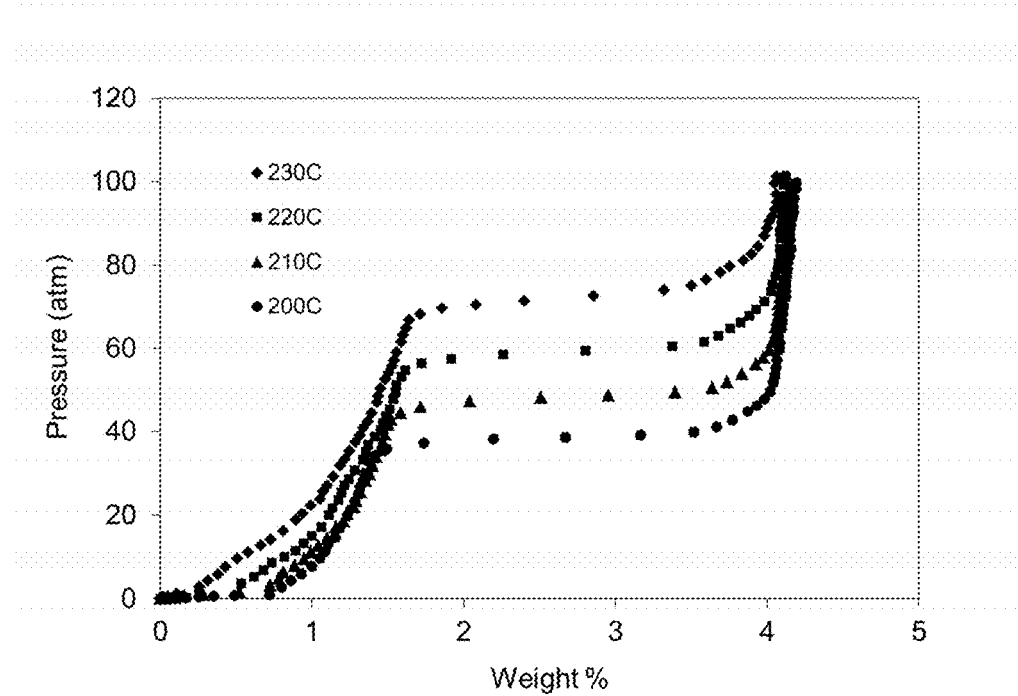
FIG. 3A is a plot of the Desorption PCT isotherms for an RbH-doped $2LiNH_2/MgH_2$ mixture according to an embodiment of the present invention.
Figure 3B:
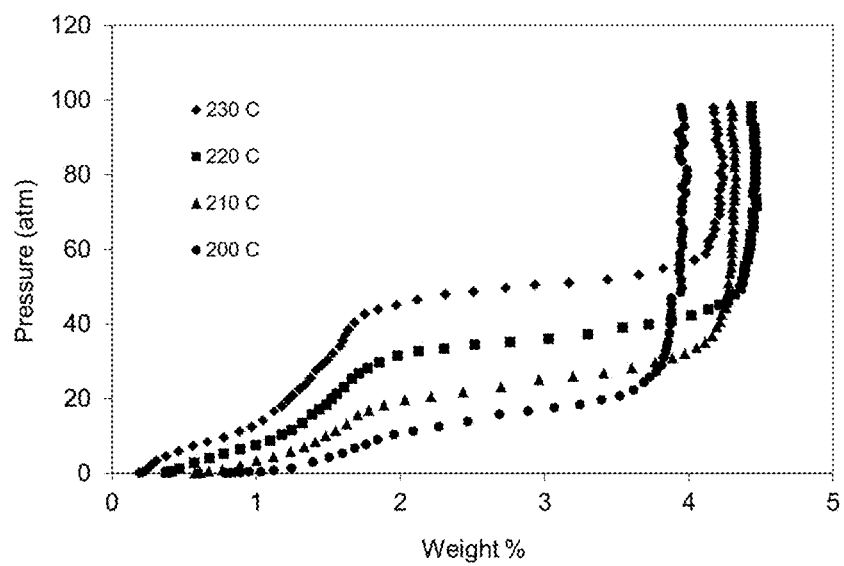
FIG. 3B is a plot of the Desorption PCT isotherms for an uncatalyzed $2LiNH_2/MgH_2$ mixture.
Figure 4:
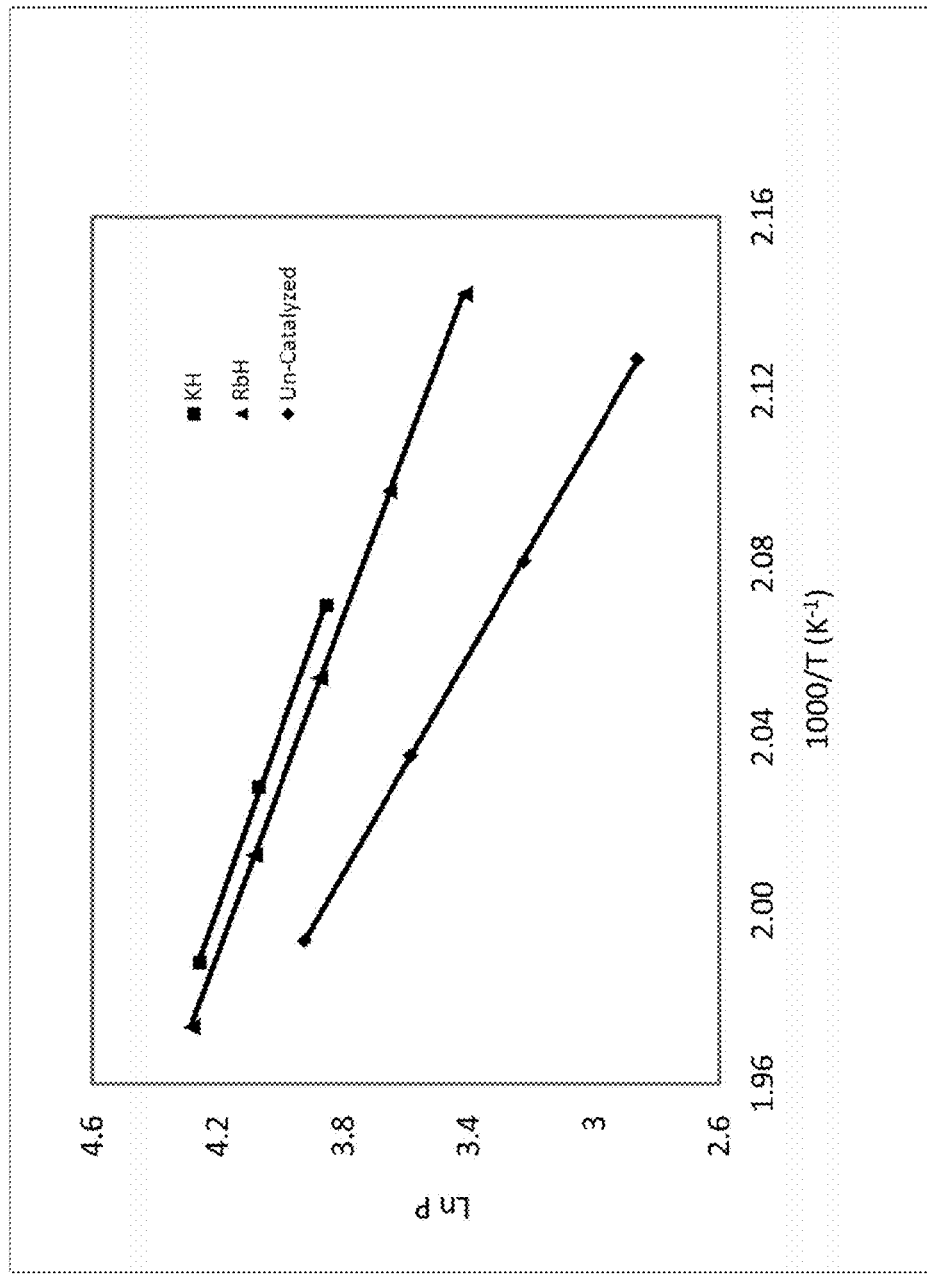
FIG. 4 are van't Hoff plots of hydrogen desorption from a catalyzed $2LiNH_2/MgH_2$ mixture according to an embodiment of the invention and an uncatalyzed $2LiNH_2/MgH_2$ mixture.

Thermodynamic stabilities were determined from pressure composition temperature (PCT) isotherm measurements that were carried out on the catalyzed and uncatalyzed mixtures. Measurements were made in the 200-230° C. range. FIG. 3A contains the PCT isotherms for the RbH-doped mixture, and FIG. 3B contains the PCT isotherms for the uncatalyzed mixture. The isotherms show a well-defined plateau region at each temperature. The plateau pressures for the RbH-doped mixture are higher than those for the uncatalyzed mixture under the same temperature conditions. The plateau pressures were used to construct van't Hoff plots, and the slopes were used to determine the ΔH values for the desorption reactions. Van't Hoff plots for the RbH-doped, KH-doped, and uncatalyzed samples are shown in FIG. 4. The enthalpy values obtained for the different mixtures are shown in Table 1.

The desorption enthalpy values obtained for the RbH-doped mixture (42.7 kJ/mol) and the KH-doped mixture (42.0 kJ/mol) are similar in magnitude. This is to be expected since the hydrogen desorption temperatures of both of these mixtures are nearly the same. These enthalpies are significantly lower than that (65 kJ/mol) found for the uncatalyzed mixture. This is also expected since desorption of hydrogen from the uncatalyzed mixture occurs at a much higher temperature than those for the catalyzed mixtures. While not wishing to be limited to theory, it is likely that these findings can be explained based in part on the fact that Rb and K have the same Pauling electronegativity value, 0.82, and both of these electropositive elements have nearly equal destabilizing effect on the N—H bond, resulting in significant reductions in the desorption temperature and enthalpy.

Differential Thermal Analysis (DTA) and Kissinger Plots

Figure 5:
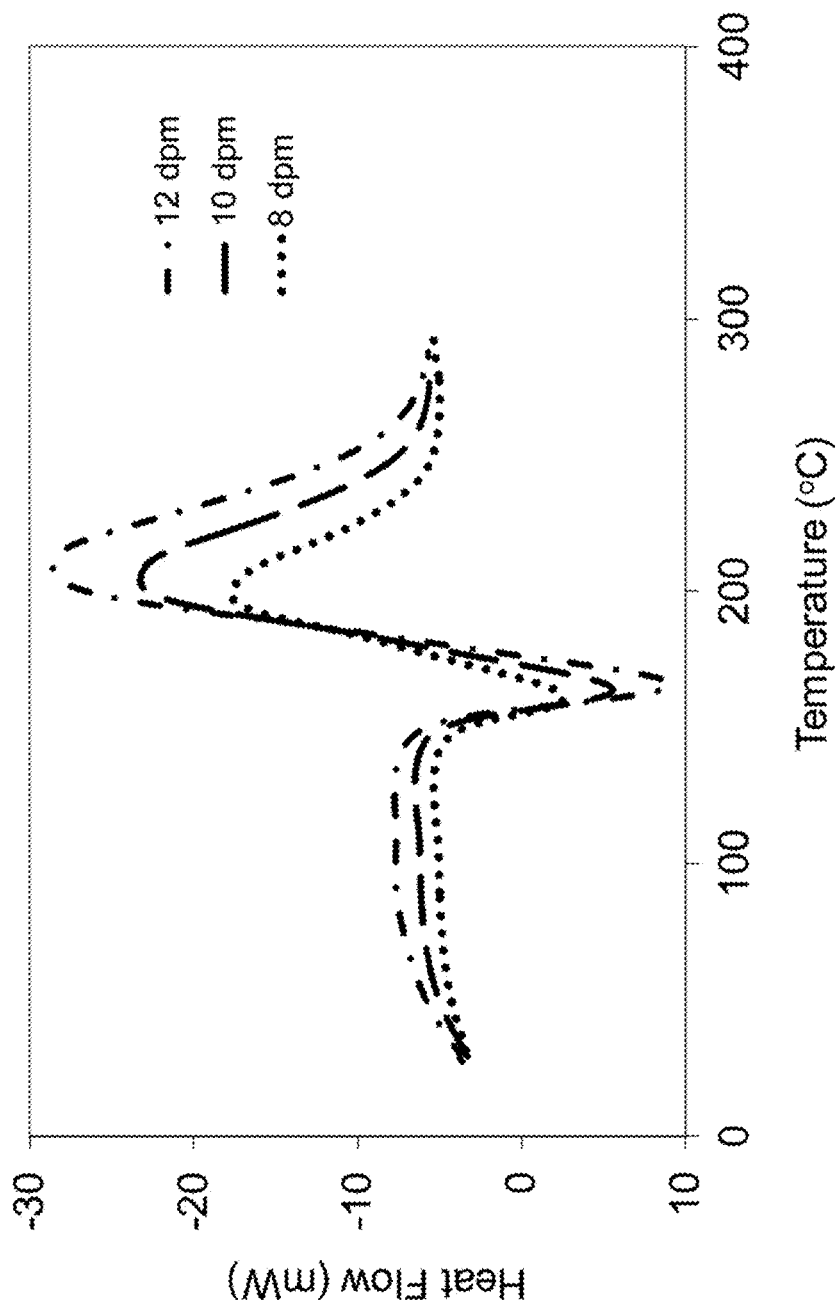
FIG. 5 are differential thermal analysis plots for a $2LiNH_2/MgH_2$ mixture catalyzed with RbH according to an embodiment of the invention. The scan rate units (dpm) denote degrees per minute.

Differential thermal analysis curves (DTA) were created to understand the effects of the catalytic additives on the dehydrogenation of LiNH$_2$/MgH$_2$ mixtures. The DTAs were carried out for the catalyzed and uncatalyzed mixtures at different heating rates between 4 and 20° C. per minute. FIG. 5 shows the DTA curves for the RbH-doped mixture at different heating rates. The plots show that the desorption temperatures increase with increasing scan rates. These scans are typical of those that were obtained for the other mixtures. There is a relationship between the scan rate and the activation energy that is described by the Kissinger equation:

$$\ln\left(\frac{\beta}{T_{max}^2}\right) = -\frac{E_a}{R}\left(\frac{1}{T_{max}}\right) + F_{KAS}(\alpha) \qquad (3)$$

where T$_{max}$=the temperature at maximum reaction rate; β=heating rate; E$_a$=the activation energy; α=the fraction of transformation; F$_{KAS}$(α) is a function of the fraction of transformation; and R=the gas constant.

Figure 6:
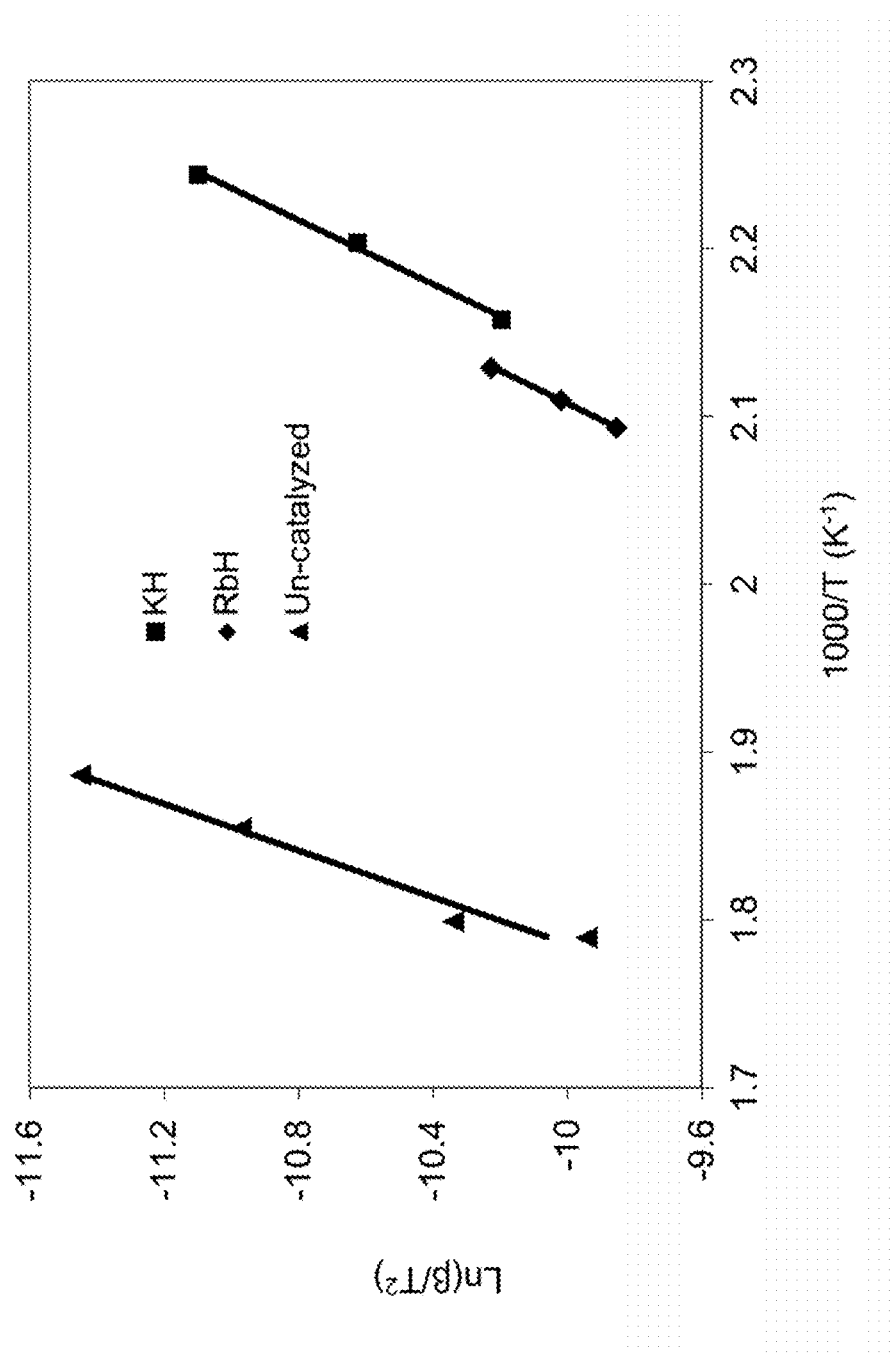
FIG. 6 are Kissinger plots for a catalyzed $2LiNH_2/MgH_2$ mixture according to an embodiment of the invention and an uncatalyzed $2LiNH_2/MgH_2$ mixture. $\beta$ represents the scan rate.

Kissinger plots for various mixtures were constructed from the data obtained from the DTA curves. The slopes of these plots, shown in FIG. 6, were used to determine the activation energies of each mixture. The activation energies for KH- and RbH-doped mixtures are 87 and 86.8 kJ/mol, respectively, which is much smaller than the activation energy (119 kJ/mol) for the uncatalyzed mixture. Again, not to be bound by theory, but the similar activation energies for the two catalyzed mixtures may be correlated with the electronegativity values of Rb and K in the same way as was done for desorption temperatures. Table 1 shows the activation energy values of all the mixtures.

Kinetics and Modeling

Fast reaction rate is just as important as low desorption temperatures according to the DOE requirements for hydrogen storage systems. Therefore comparisons were made of the desorption kinetics of catalyzed and uncatalyzed systems. Kinetics measurements were carried out for each mixture in the two-phase plateau region at 210° C. using constant pressure thermodynamics forces. Constant pressure thermodynamic force is achieved by keeping the ratio of the plateau pressure to the applied pressure constant for all measurements. The ratio has been defined as the N-Value. An N-Value of 10 was applied to all samples. A summary of the plateau pressures at 210° C. is shown in Table 1.

Figure 7:
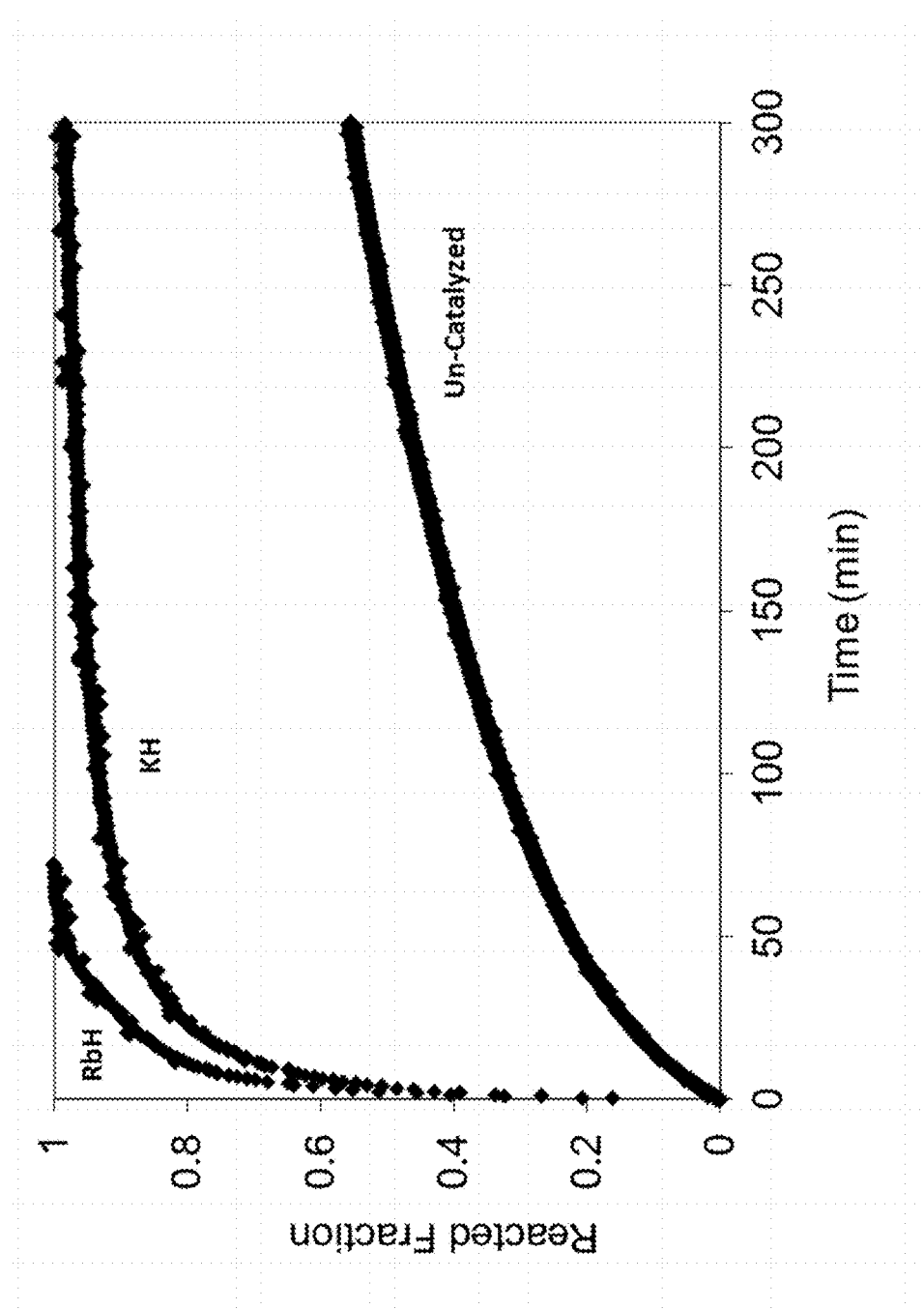
FIG. 7 is a plot of the relative rates of hydrogen desorption for an uncatalyzed sample of $2LiNH_2/MgH_2$, a sample catalyzed with KH, and a sample made according to an embodiment of the present invention.

FIG. 7 contains the desorption kinetics plots of $2LiNH_2/MgH_2$ mixtures with and without RbH and KH catalysts. The order of reaction kinetic rates is RbH>KH>>Uncatalyzed. The RbH-doped mixture desorbs hydrogen about twice as fast as the KH-doped and about 60 times as fast as the uncatalyzed mixture. The times taken by the various reactions to reach 90% completion ($T_{90}$) are shown in Table 1.

The fact that the RbH-doped mixture desorbs hydrogen twice as fast as the KH doped mixture was unexpected based on the fact that both Rb and K have the same electronegativity. Kinetics modeling studies were conducted to further investigate this phenomenon. The following equations were used to model the $2LiNH_2/MgH_2$ system:

$$\frac{t}{\tau} = 1 - (1 - X_B)^{1/3} \quad (4)$$

where $$\tau = \frac{\rho_B R}{b k_s C_{Ag}} \quad (5)$$

$$\frac{t}{\tau} = 1 - 3(1 - X_B)^{2/3} + 2(1 - X_B)$$

where $$\tau = \frac{\rho_B R^2}{6 b D_e C_{Ag}}$$

where t is the time at a specific point in the reaction, and $X_B$ is the fraction of the metal reacted. R is the initial radius of the hydride particles; "b" is a stoichiometric coefficient of the metal; $C_{Ag}$ is the gas phase concentration of reactant; $D_e$ is the effective diffusivity of hydrogen atoms in the hydride; $\rho_B$ is the density of the metal hydride; and $k_S$ is a rate constant.

Figure 8:
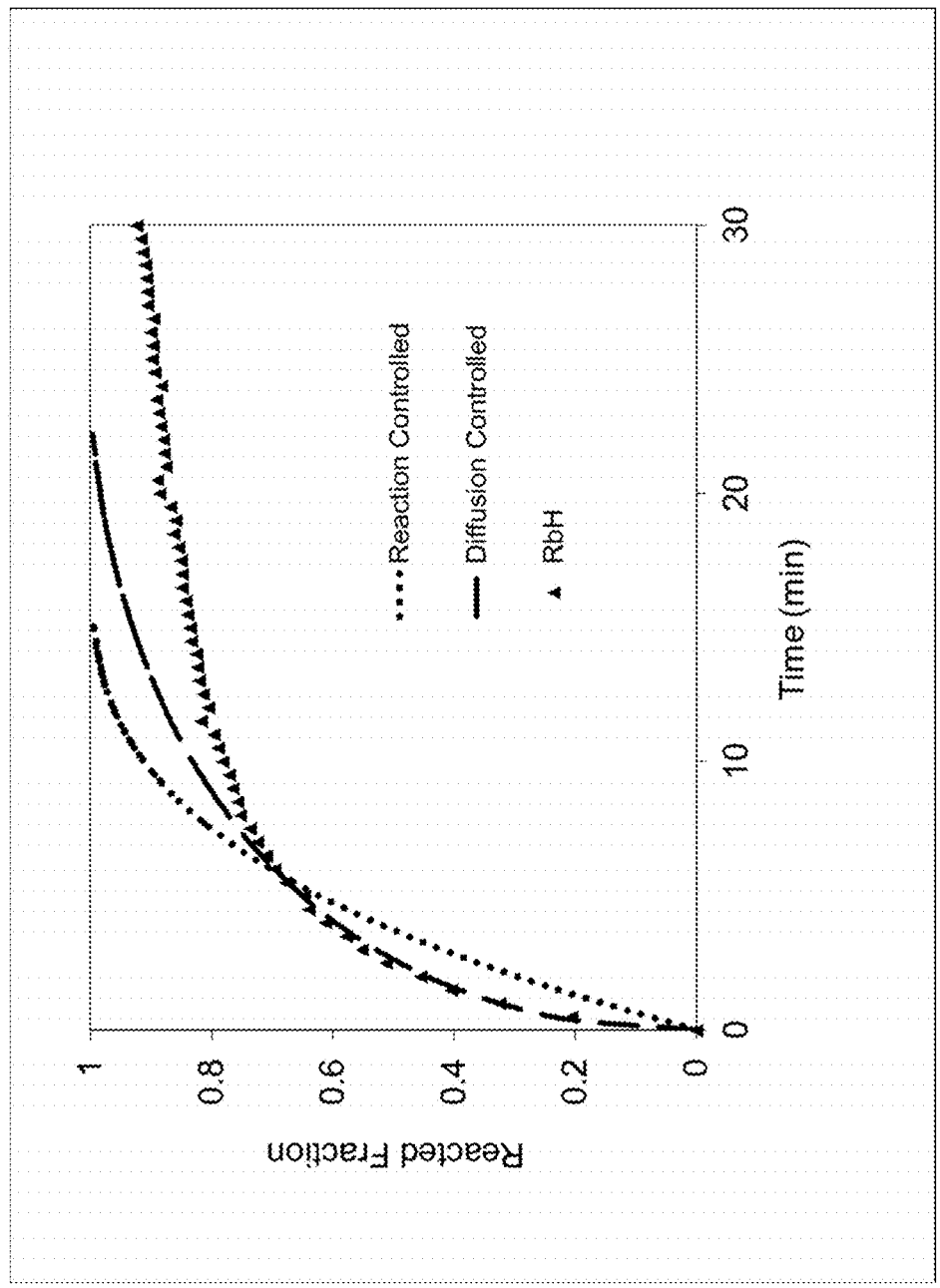
FIG. 8 includes modeling plots for an RbH-doped mixture according to an embodiment of the invention.
Figure 9:
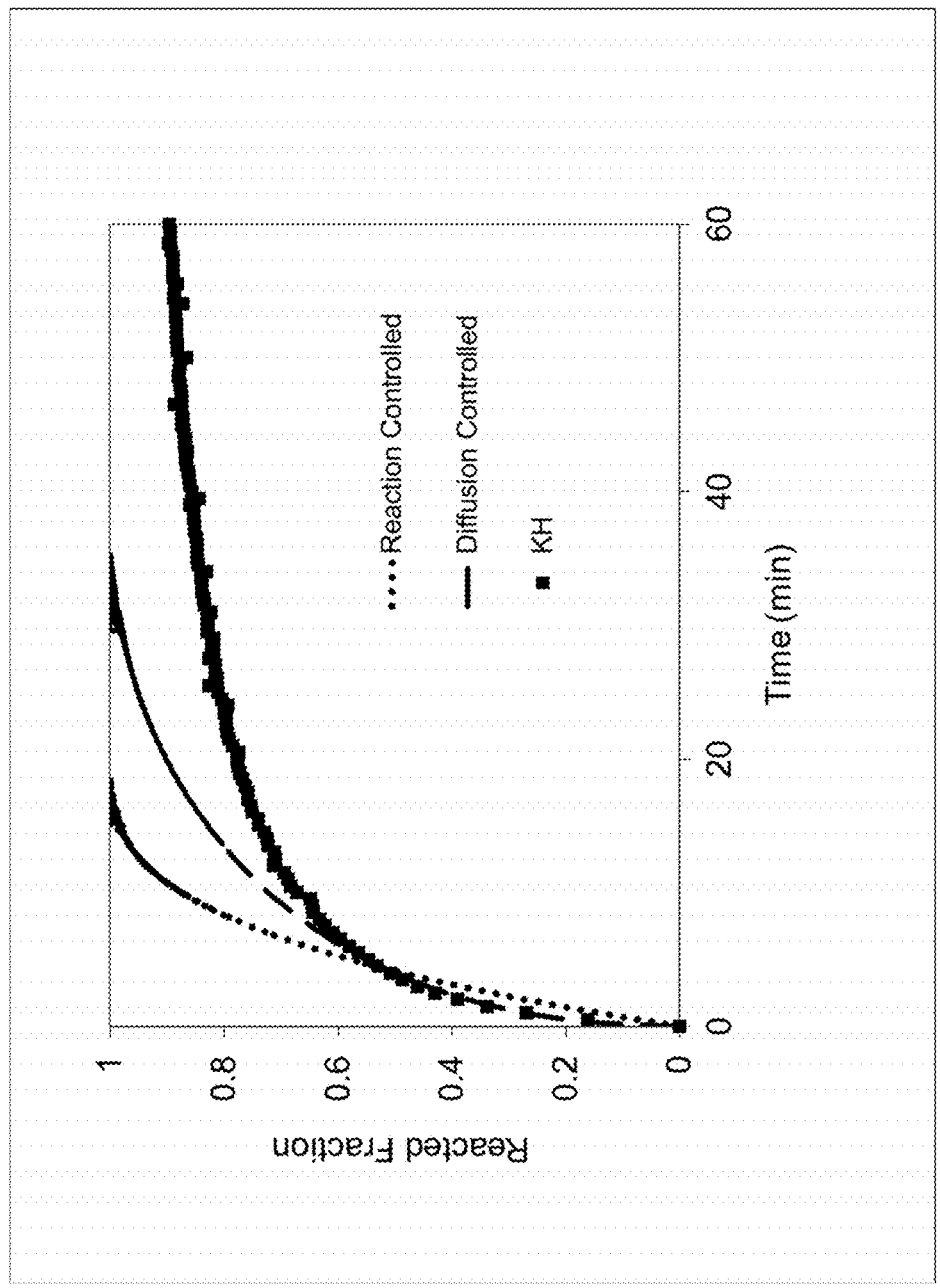
FIG. 9 are modeling plots for a KH-doped mixture.
Figure 10:
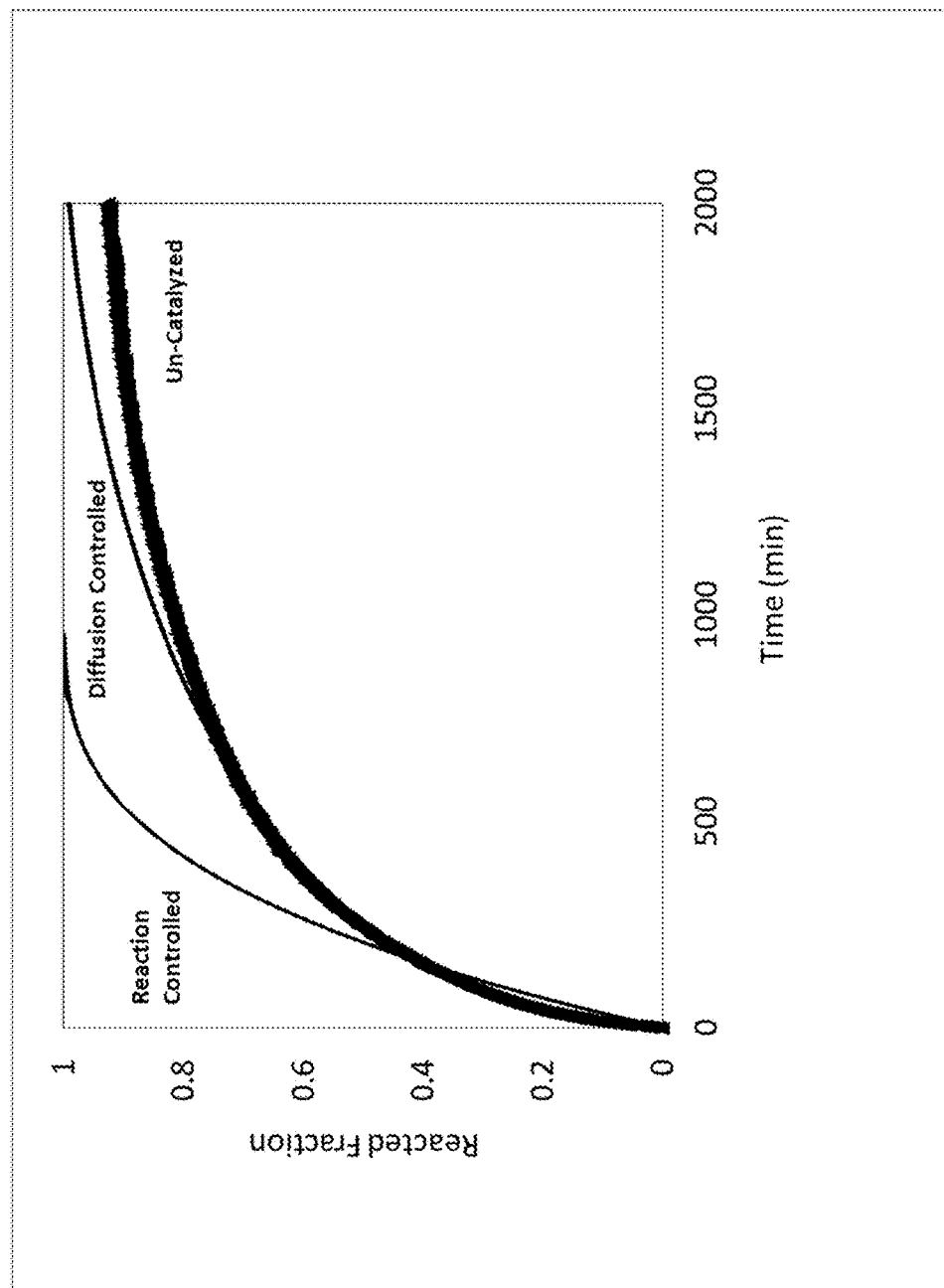
FIG. 10 are modeling plots for an uncatalyzed mixture of $2LiNH_2/MgH_2$.

Equation 4 is based on a shrinking core model with chemical reaction at the phase boundary controlling the rate, whereas Equation (5) is based on a process in which diffusion controls the reaction rate. FIGS. 8-10 show kinetic modeling results for the RbH doped, KH-doped, and uncatalyzed mixtures, respectively. Equations 4 and 5 were fitted to the kinetic data in FIG. 7 for each of the sample mixtures to determine which kinetic model best describes the reactions in this study. To determine the theoretical curves, it was first necessary to determine a value for the constant T. This was accomplished through a series of statistical data analyses to determine a value which resulted in the smallest standard deviation between the experimental and theoretical data. FIG. 8, for the RbH-doped mixture, shows three curves. One is an experimental curve taken from FIG. 7; a second curve was calculated from Equation (4); and a third curve was calculated from Equation (5).

As shown in FIG. 8, the data generated from the model with diffusion controlling the overall rate fit the experimental data better than the data generated from the model with chemical reaction controlling the overall reaction rate. This is true only during the first 70% of the reaction. During the last 30% of the reaction, neither model was a good fit with the experimental data. The reason for this is that during the first 70% of the reaction desorption occurred along the plateau region where the pressure remained relatively constant. Therefore, the N-Value was constant, and thus, the thermodynamic driving force was constant. When the reaction reached the left edge of the plateau region, the pressure decreased sharply, and the thermodynamic driving force decreased. At this point the kinetics slowed more rapidly than either model predicted. The modeling results in FIG. 9 for the KH-catalyzed mixture and in FIG. 10 for the uncatalyzed sample showed similar results. In all cases, the data generated from the model with diffusion controlling the overall rate fit the experimental data better than the data generated from the model with chemical reaction controlling reaction rate. In all the models, diffusion controlled the rates only along the two-phase plateau region.

Again, without being bound to theory, the fact that diffusion is likely the rate controlling process could be used to explain why the desorption rate in the RbH-doped mixture is faster than the KH-doped mixture. The atomic radius of Rb is 248 pm, whereas the radius of K is only 227 pm. because Rb is larger, it would cause a slight expansion of the lattice, thereby allowing the diffusing species to move faster through the lattice.

A second modeling technique for comparing the kinetics of solid state reactions was applied. The classical equation for nucleation and growth processes can be written as $$F = 1 - \exp(-Bt^m) \quad (6)$$

or $$-\ln \ln(1-F) = \ln B + m \ln t \quad (7)$$

where F is the reacted fraction; B is a constant; and "m" is a constant that can vary according to the geometry of the system.

Figure 11:
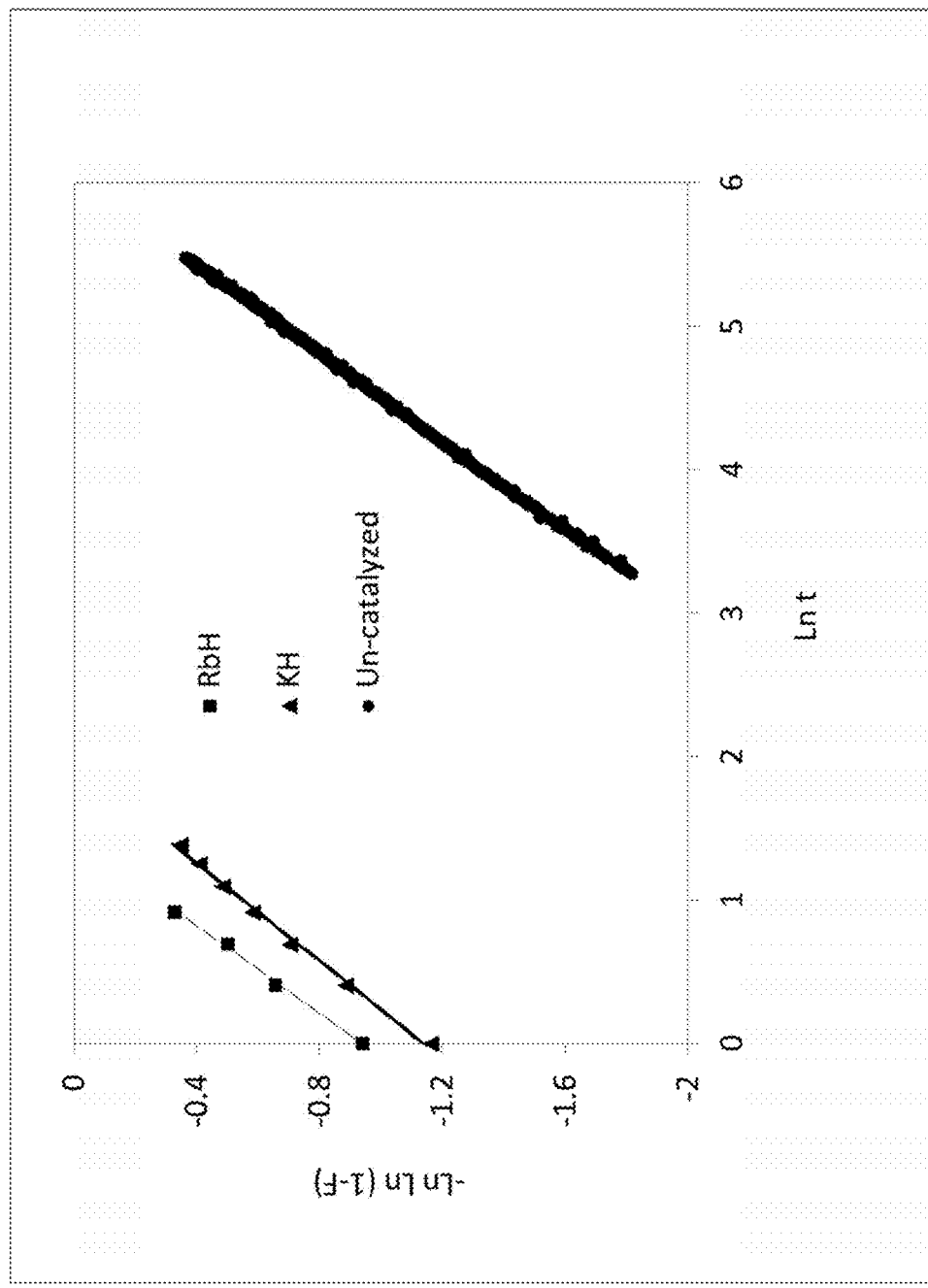
FIG. 11 is an alternative set of modeling plots for the RbH-doped mixture, the KH-doped mixture, and the uncatalyzed mixture of $LiNH_2/MgH_2$ of FIGS. 8-10.

In this method, plots of $-\ln \ln(1-F)$ vs. $\ln t$ can be constructed and used to determine the rate-controlling process. The slope "m" is an indication of the rate-controlling process. In the analysis, "m" values in the 0.54-0.62 range denote diffusion-controlled reactions. Values in the 1.07-1.11 range indicate a phase boundary controlled process. FIG. 11 contains plots of $-\ln \ln(1-F)$ vs. $\ln t$ for the doped and uncatalyzed systems studied. In each case the analysis was done with reacted fraction values in the 0.15-0.50 range (or 15-50%). The values of "m" obtained for each mixture are tabulated in Table 1. The data show that the values for all the systems correspond most closely to those expected for diffusion-controlled reactions. Thus, two entirely different approaches indicated that diffusion is most likely the rate controlling process in the $2LiNH_2/MgH_2$ system.

Based on these results, RbH is an effective and improved catalytic additive for a lithium amide/magnesium hydride system over KH. Temperature-programmed desorption measurements showed that the addition of approximately 3 mol % RbH lowered the desorption temperature of the system by 94° C., which is somewhat better than KH. Desorption enthalpies for the catalyzed samples were found to be approximately 42 kJ/mol, which is significantly lower than the 65 kJ/mol that was found for the uncatalyzed mixture. The hydrogen desorption rate of the RbH-doped sample was found to be approximately twice as fast as the KH-doped sample and about 60 times faster than the uncatalyzed sample. The RbH and KH additives have nearly the same capability for lowering the hydrogen desorption temperature of the 2LiNH$_2$/MgH$_2$ mixture.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A metal hydride alloy comprising magnesium hydride (MgH$_2$), lithium amide (LiNH$_2$), and at least one catalyst, wherein the at least one catalyst includes rubidium hydride (RbH).

2. The metal hydride alloy of claim 1 having a molar ratio of total moles of RbH and LiNH$_2$ to MgH$_2$ in a range of 1.8:1 to 2.2:1.

3. The metal hydride alloy of claim 1, wherein the RbH comprises at least 1 mol % of the metal hydride alloy.

4. The metal hydride alloy of claim 1, wherein the RbH comprises at least 2 mol % of the metal hydride alloy.

5. The metal hydride alloy of claim 1, wherein the RbH comprises at least 3 mol % of the metal hydride alloy.

6. A hydrogen storage system comprising a vessel containing a metal hydride alloy according to claim 1.

7. A vehicle comprising the hydrogen storage system according to claim 6.

8. A method of making the metal hydride alloy of claim 1 comprising combining magnesium hydride (MgH$_2$) and lithium amide (LiNH$_2$) and at least one catalyst in a vessel to form a mixture and mechanically milling the mixture, wherein the at least one catalyst includes rubidium hydride (RbH).

9. The method of claim 8, wherein the mixture has a molar ratio of total moles of RbH and LiNH$_2$ to MgH$_2$ in a range of 1.8:1 to 2.2:1.

10. The method of claim 8, wherein the RbH comprises at least 1 mol % of the mixture.

11. The method of claim 8, wherein the RbH comprises at least 2 mol % of the mixture.

12. The method of claim 8, wherein the RbH comprises at least 3 mol % of the mixture.

* * * * *

UNITED STATES PATENT AND TRADEMARK OFFICE
CERTIFICATE OF CORRECTION

| | |
|---|---|
| PATENT NO. | : 9,604,847 B2 |
| APPLICATION NO. | : 14/264875 |
| DATED | : March 28, 2017 |
| INVENTOR(S) | : Andrew Goudy, Tolulope Durojaiye and Jalaal Hayes |

It is certified that error appears in the above-identified patent and that said Letters Patent is hereby corrected as shown below:

In the Specification

At Column 1, Line 5, please insert:
--This invention was made with government support under the following grant numbers: DE-FC36-06GO86046 awarded by the Department of Energy; and DTOS59-07-G-00056 awarded by the Department of Transportation. The government has certain rights in the invention.--

Signed and Sealed this
Thirtieth Day of April, 2024

Katherine Kelly Vidal
*Director of the United States Patent and Trademark Office*